United States Patent [19]
Larson

[11] Patent Number: 5,644,604
[45] Date of Patent: Jul. 1, 1997

[54] DIGITAL PHASE SELECTOR SYSTEM AND METHOD

[75] Inventor: Jeffrey Dale Larson, San Jose, Calif.

[73] Assignee: Hal Computer Systems, Inc., Campbell, Calif.

[21] Appl. No.: 338,397

[22] Filed: Nov. 14, 1994

[51] Int. Cl.⁶ .................................................. H04L 7/00
[52] U.S. Cl. .................................................. 375/354
[58] Field of Search .................................. 375/373, 347, 375/354; 455/132, 133, 134, 135; 371/1

[56] References Cited

U.S. PATENT DOCUMENTS

| 4,573,173 | 2/1986 | Yoshida | 375/118 |
| 4,890,303 | 12/1989 | Bader | 375/107 |
| 5,022,056 | 6/1991 | Henderson et al. | 375/119 |
| 5,203,023 | 4/1993 | Saito et al. | 455/133 |

Primary Examiner—Stephen Chin
Assistant Examiner—Kevin Kim
Attorney, Agent, or Firm—John T. McNelis; Robert P. Sabath

[57] ABSTRACT

A system and method for transferring data between clock domains operating at substantially the same frequency continuously compares the relationship between a delayed data phase signal driven by a non-delayed source domain clock and a data phase signal sampled by a delayed receiving domain clock. The result of the comparison determines along which one of multiple data paths within the synchronizing circuit the transfer of the data frame will take place. Several data paths with different delays (at least two) transfer the data frame and clock signals. An XNOR comparator responds to the relationship between a delayed data phase signal driven by a non-delayed source domain clock and a data phase signal sampled by a delayed receiving domain clock to determine which one of the multiple data paths transfers the data frame.

7 Claims, 6 Drawing Sheets

DIGITAL PHASE SELECTOR SYSTEM AND METHOD

CROSS REFERENCE TO RELATED APPLICATION

This application is related to a patent application filed on Apr. 6, 1994, and entitled "MULTI-PATH DATA SYNCHRONIZER SYSTEM AND METHOD." This co-pending patent application has Ser. No. 08/223,575. This patent application is assigned to the same assignee as herein, and is incorporated herein by reference in its entirety.

FIELD OF THE INVENTION

This invention relates to techniques for transferring data in blocks or packets or frames between clock domains operating at nominally the same clock frequencies at high data transfer rates and with low latency or delay.

Background of the Invention

Large computer systems commonly require clock signals to be distributed over long distances. This constitutes a significant engineering problem for clock signals at very high frequencies for which variations in propagation delays attributable, for example, to variations in the length of a clock signal conductor, can introduce skews in clocked events occurring at distant locations in the computer system.

One common technique to improving system fault tolerance and simplifying clock distribution in large computer systems is to introduce multiple clocks operating in separate clock domains of the system at substantially the same frequency. However, data which is transferred between separate clock domains requires synchronization with the clock in the receiving domain to preserve the clock-oriented integrity of the transferred data. Synchronization circuits for this purpose commonly involve phase-locked loops which link the sending and receiving clock domains to avoid latency or delays in transferring data between such domains. However, such phase-locked loops typically require incorporation of the clock oscillator within a feedback loop which frequently is not conveniently possible. In addition, phase-locked loops commonly operate at undesirably high levels of power dissipation. More importantly, where such clock domains communicate with several other clock domains, it is typically not possible to identify one clock to which all clock domains will synchronize.

Another conventional technique for synchronizing the transfer of data between clock domains uses a dual-port memory unit such as a first-in, first-out (FIFO) buffer which can be written to and read from at different time intervals, and at different frequencies. One disadvantage of such techniques is the latency or delay that is introduced into the communication of data between clock domains. In such techniques, the data (typically in a block or a frame) must be written or stored in the memory unit. A control signal typically must be propagated from the transmitting to the receiving domain to enable the read of data from the memory unit to the receiving domain.

SUMMARY OF THE INVENTION

According to the present invention, data is transferred between clock domains operating at substantially the same frequency. The system according to the present invention continuously compares the relationship between a delayed data phase signal driven by a non-delayed source domain clock and sampled by a receiving domain clock and a data phase signal sampled by a delayed receiving domain clock. The system further retains the current state of comparison at the start of a transfer of a block or frame of data for determining along which one of multiple data paths within a synchronizing circuit the transfer of the data frame will take place. Several data paths with different delays (at least two) transfer the data frame and clock signals. An XNOR comparator responds to the relationship between a delayed data phase signal driven by a non-delayed source domain clock and a data phase signal sampled by a delayed receiving domain clock to determine which one of the multiple data paths transfers the data frame. Comparisons under the present invention are done by a digital phase comparison circuit capable of enhanced operation in noisy environments and not relying upon predetermined duty-cycle clocks for accurate operation. The digital phase comparison circuit according to the present invention consumes less circuit space than analog circuits used for synchronization between different clock domains. The digital phase comparison circuit according to the present invention further accommodates for skew between clock edges and data transition edges.

DESCRIPTION OF THE PREFERRED EMBODIMENT

Figure 1:
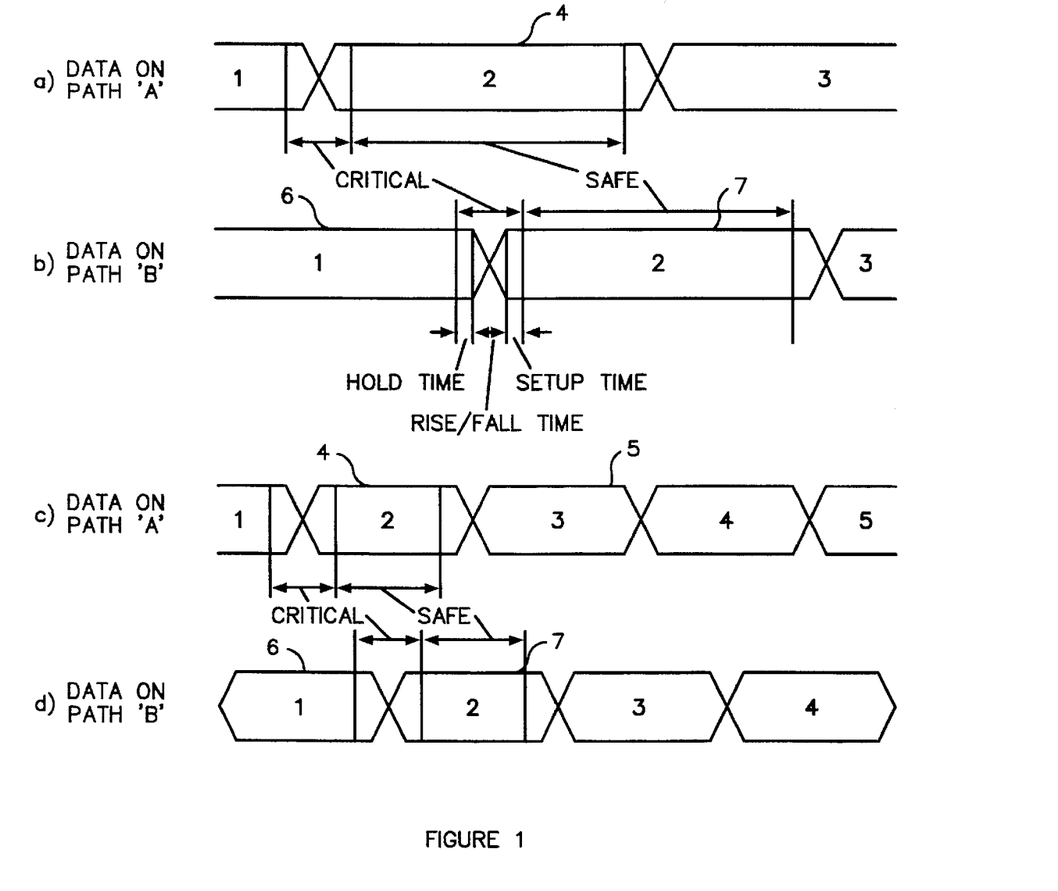
FIG. 1 is a graph illustrating clocked data intervals.

Referring now to FIGS. 1a and 1b, there is shown a simplified sequence of different clock-oriented data words being transferred from a data transmitter to a data receiver along two data paths, A and B. The "safe" designation means that a clock transition (i.e. data associated with one clock domain is transferred to another clock domain) occurring in this interval results in correct latching of the data, and the "critical" designation means that a clock transition occurring in this interval might result in corrupted data due to transients and violations of operating requirements of logic circuits involved. Each of the intervals 4–7 are shown representing the envelope of valid data words being transferred on n-bit wide data buses of path 'A' and path 'B' between a data transmitter in one clock domain and a data receiver in another clock domain. As illustrated, the 'safe' interval on path 'B' is delayed sufficiently to completely overlap the critical interval on path 'A', and vice versa. The 'critical' interval, including the rise or fall times of data signals and the set up and hold times of the logic circuits, essentially depends upon the technology involved, and at least the 'safe' interval decreases with increasing frequency, as illustrated in FIGS. 1c and 1d. Where the 'safe' interval becomes too small at higher clock frequencies to overlap the 'critical' interval, additional paths may be needed, where the phase shifts of data transferred along two neighboring paths (ex. A and B) is:

$$360°/n \qquad \text{(Eq. 1)}$$

where n=number of total paths, and additional phase shifts of neighbor-paths (Ex. at 0°, 90°, 180° and 270° for n=4) may be appropriate.

Figure 2:
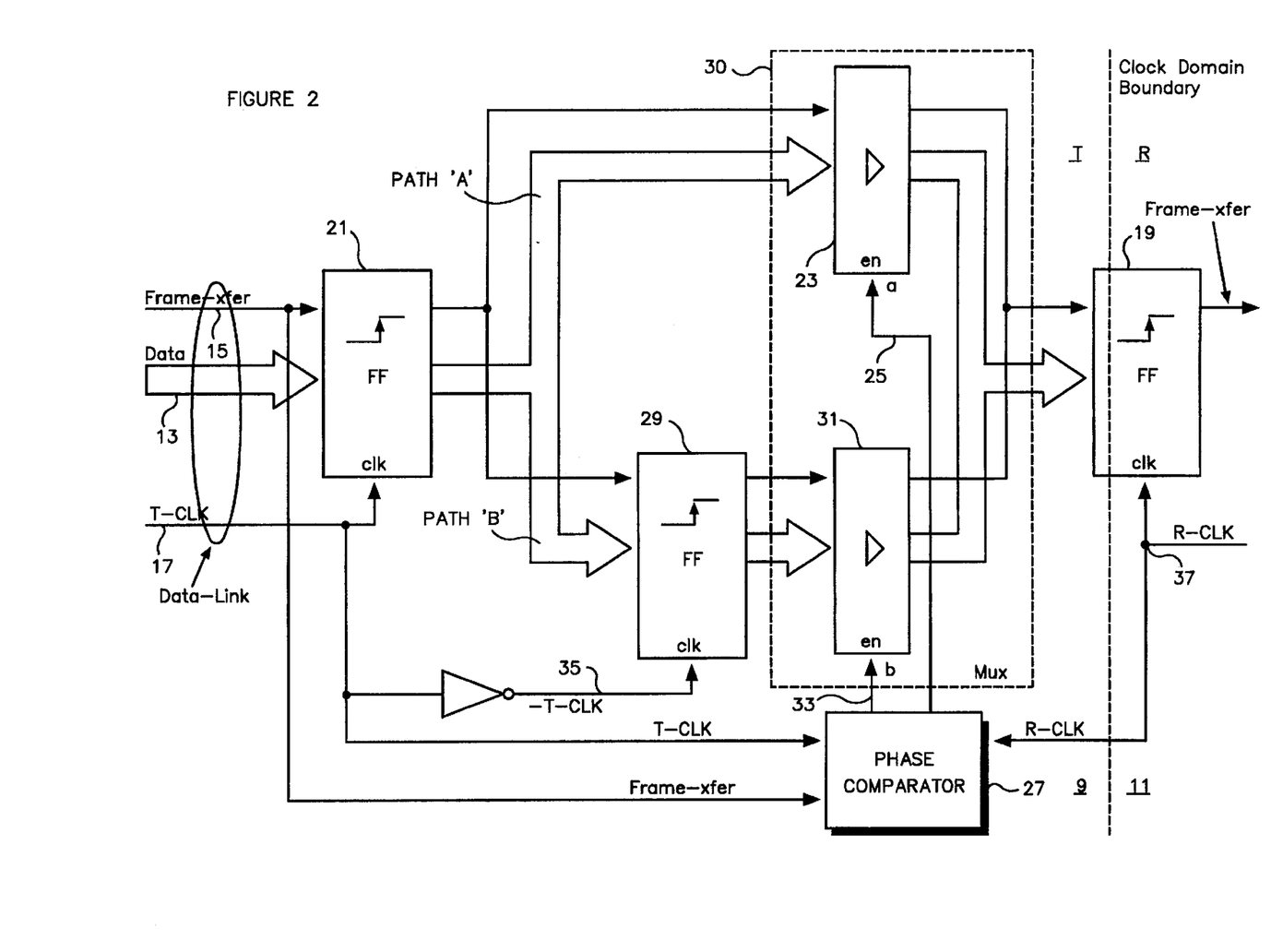
FIG. 2 is a block schematic diagram of a data synchronizer.

Data words are typically transferred between clock domains as n bits along n parallel conductors, and are transferred with associated clock signals. Thus, as illustrated in the embodiment of FIG. 2, there is shown a block schematic diagram of a data synchronizer including two data paths between a transmitting clock domain 9 and a receiving clock domain 11. The data 13 to be transmitted to the receiving domain 11 occurs in data packets or blocks commonly referred to as frames, and is associated with a Frame Transfer (frame-xfer) signal 15 and the accompanying clock signal 17 from the clock (not shown) of the transmitting domain 9. The transmitter clock T-clk and the receiver clock R-clk are independent clock oscillators with nominally the same clock frequencies. The data synchronizer of the present invention resides in the transmitting clock domain, although it resides at the distal end of the data link adjacent the receiving domain. The synchronizer operates on the basis that data logic circuits such as a flip flop or register 19 in the next stage (i.e., in the receiving domain 11) will be capable of latching data for a fraction, $\alpha$, of the clock period (e.g., up to one-half clock period). The time interval, or window (i.e., the critical "window"), within which direct data latching is not possible or is unreliable is a relatively short interval, as illustrated in FIGS. 1(a)–1(d). Of course, data signals in a clock domain can have a constant phase-shifted relationship to the clock-oscillator of the domain. And, since the data and clock signals are transferred on parallel wires of common lengths, these signals maintain their relative timing (with only a possibility of relatively small skew) as transferred to the receiving domain.

Accordingly, the data frame to be communicated from the transmitting domain 9 to the receiving domain 11 passes in conventional manner at clocked intervals through the register 21 along one of two (or more) paths with different delays to the register 19 of the receiving domain 11. The first path A includes a gate 23 that is enabled in response to an enabling signal 25 applied thereto by the phase comparator 27, as later described herein. The second path B includes a register 29 and a gate 31, where the gate 31 is enabled in response to an enabling signal 33 applied thereto by the phase comparator 27, and the register 29 is clocked 35 at alternate half cycles (i.e., inverted or 180°-shifted for a two-path synchronizer) of the clock of the transmitting domain 9. Gates 23 and 31 may be considered to comprise alternate transmission branches of a multiplexer 30. The frame-xfer signal 15 is coupled to and through all registers 21, 29, 19 and gates 23, 31 and is also supplied to the phase comparator 27. The phase comparator 27 also receives clock signals 17, 37 both from the clock of the transmitting domain 9 and from the clock of the receiving domain 11.

In operation, the time interval within which direct data latching in response to applied clock signals is not possible, or is unreliable, is relatively small, and the overlap between the two paths A and B (i.e., the two windows within which both paths work well and reliably) is relatively large. The switch over from one to another of the paths is therefore typically not critical. However, for circuit technology that is used in the domains 9 and 11, if the phase window or time interval within which direct data latching is not possible, or is unreliable, is relatively large, then four or more paths may be used to assure proper data synchronization via incrementally-delayed transfer paths controlled by fractionally-delayed clock signals in such multiple paths. Ideally, at least two switches occur between one data path and another data path per cycle of the beat or difference frequency (between the clock frequencies of the two clocked domains), and such switches between data paths occur in intervals or gaps between successive data frames being transmitted between the clocked domains.

As a basic assumption, the unit of data transmitted between clock domains 9, 11 is a frame or block of data that requires only a small number of cycles. The clocks of nominally same frequency may only drift relatively slightly during a frame transfer, and it is therefore not necessary to switch paths within the interval of a frame transmission. The decision regarding which transmission path to use for a frame transfer is therefore only made once per transmitted frame just before the transfer starts. As illustrated in FIG. 2, the decision regarding which path A or B to use is determined only once for each frame of data. The clocks of the transmitting and receiving domains 9, 11 typically are stable to within about 50 parts per million and, therefore are not expected to drift apart significantly in frequencies during a frame transfer, and the clock signals are expected to retain approximately 50% duty cycles. While the frame-xfer signal 15 is inactive, the phase shift between the two clocks of the transmitter and receiver domains are tracked. Then, when the frame-xfer signal 15 occurs, (and stays active during the entire transfer of the frame) the current state is fixed for the duration of the transfer of the frame of data. Thus, if the phase relationship of the two domain clocks is between about 90° and 270° at the occurrence of a frame-xfer signal 15, path A is activated by enabling the gate 23 to pass the data frame 13 through register 21 and gate 23 to the receiving register 19. Alternatively, if the phase relationship between the two domain clocks at the occurrence of a frame-xfer signal 15 is between about −90° and 90°, path B is activated by enabling the gate 31 to pass the data frame 13 through registers 21 and 29, and through the gate 31 to the receiving register 19. In this path B, the data is first latched in register 29 with the inverted or 180°-shifted transmitter clock 35 and in this manner is suitably delayed to allow synchronization with the clock of the receiving domain 11 in the receiving register 19. The resulting selection between path A and path B includes substantial overlap as illustrated in FIGS. 1(a)–1(b), to assure that the switching between the paths will not be critical and data will transfer adequately well for any given phase relationship of the clocks of the two domains. Narrow windows with phase relationship between the two clocks and occurring about 0° and 180° are overcome by selecting path A to transfer data for phase relationships between about 90° and 270°, and by selecting path B to transfer data for phase relationships between about −90° and 90°. In addition, on a cable of conductors of common lengths for transferring data and clock signals, the clock is delayed by substantially the same amount of time that the data is delayed in the transfer along the same lengths of conductors. This assures that the phase relationship is preserved between the data being transferred and the clock of the transmitting domain in each data transfer.

Figure 3:
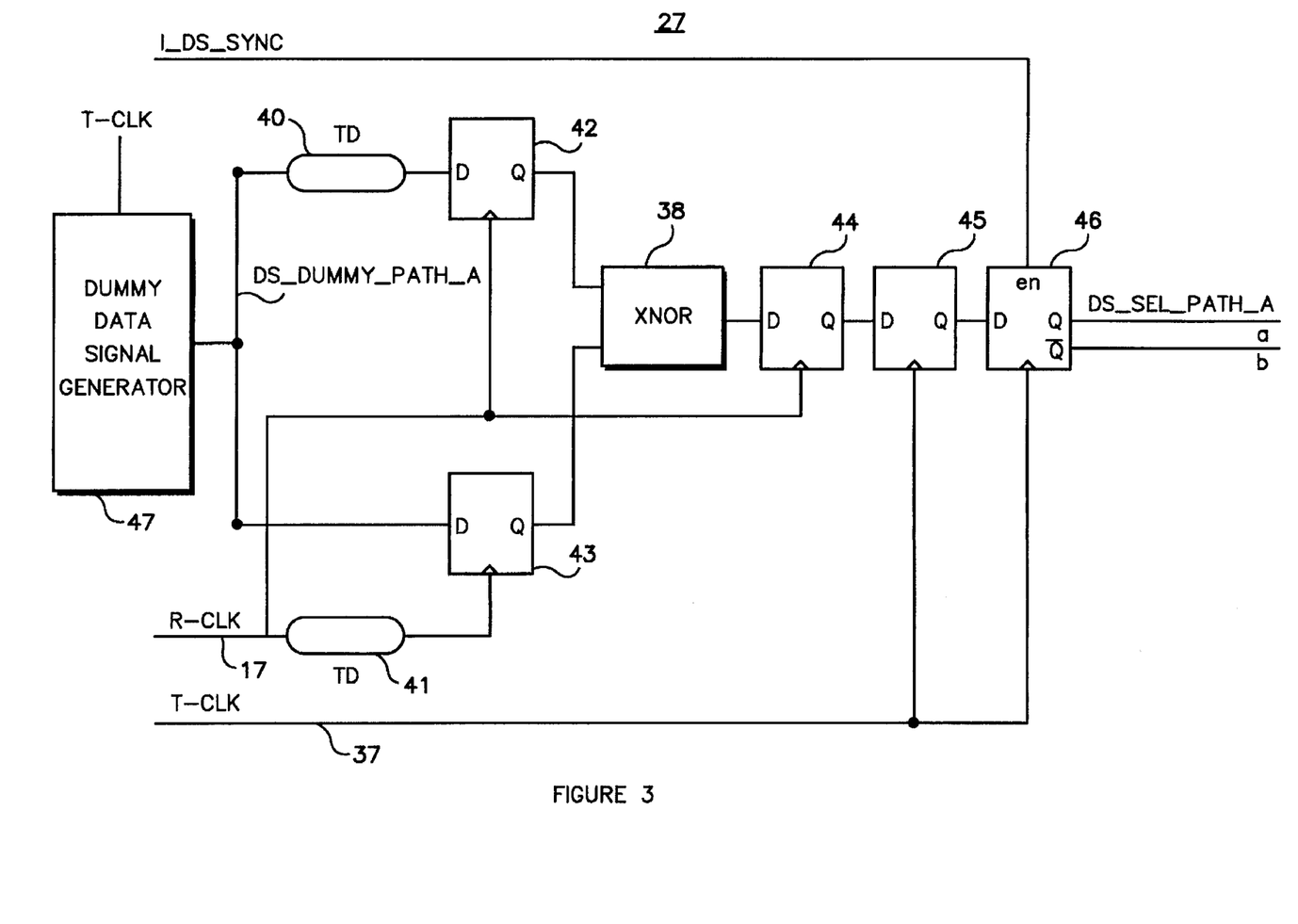
FIG. 3 is a schematic diagram of a phase comparator for operation in the circuit of FIG. 2.

Referring now to FIG. 3, there is shown a schematic diagram of the phase comparator 27 including an Exclusive NOR (XNOR) gate 38 that is connected to receive the clock signals 17, 37 from both the receiving and the sending clock domains. Phase comparator 27 further includes delay elements 40 and 41 and D-type flip-flops 42 and 43. Delay elements 40 and 41, according to one embodiment of the present invention, produce substantially the same predetermined time delay in electric signals passing through the respective delay elements 40 and 41. According to one embodiment of the present invention, delay elements 40 and 41 can be simple inverters of predetermined signal propagation time delay characteristics, or selected series of such inverter. According to alternative embodiments of the invention, variable delay elements can be selected, including for example phase lock loops. Alternatively, the delay may be variable by multiplexed selection of one of several parallel delay paths each including a different delay characteristic.

Figure 4:
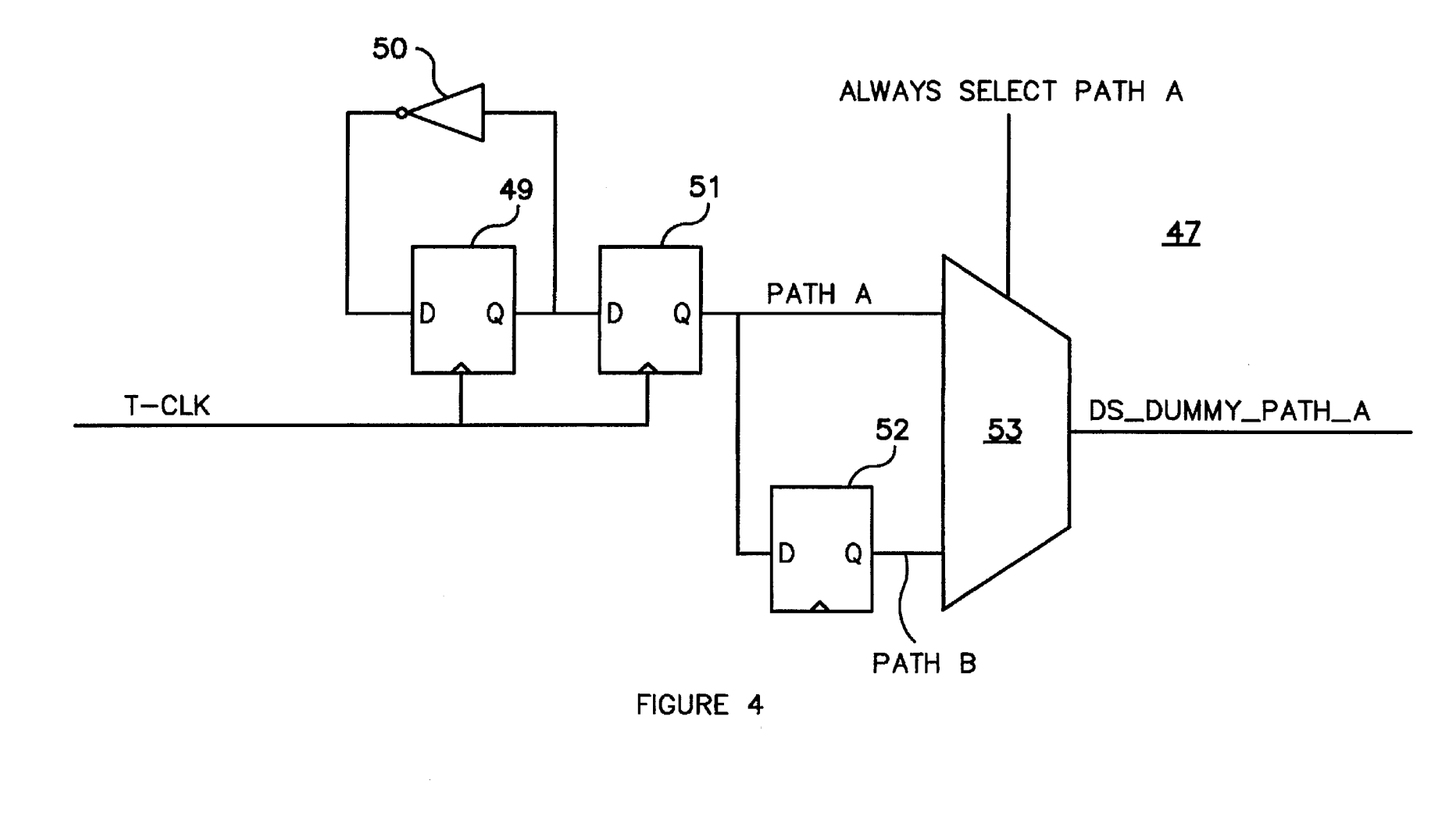
FIG. 4 is a schematic diagram of a dummy data signal generator circuit for operation in the circuit of FIG. 2.

Delay element 40 in FIG. 3 receives the dummy data phase signal, DS_DUMMY_PATH_A, at its input side. Further, the output of delay element 40 is connected to the D-input of flip-flop 42. The dummy data signal is produced, according to an embodiment of the present invention, by circuitry as shown in FIG. 4, as discussed below, to represent actual data transitions in a selected data path. In particular, the dummy data signal transitions with the clock transition of the source clock. Further, the dummy data phase signal is subject to the loads and conditions faced by an actual data signal applied through the sending clock domain. A delay imposed upon this continuously transitioning dummy data signal ensures that when sampling occurs, the portion of the signal evaluated for logical state level will be a portion that would have already passed by at the selected time of evaluation. Accordingly, this permits a logical state comparison of the logical level immediately before an intended data transfer event. The delay imposed upon the receiving clock results in a late sample time, i.e., a sampling of logical state after the selected data transfer time. This entire assessment is made by mirroring events to occur in the future by comparable earlier cycle conditions.

In particular, comparator 27 of FIG. 3 samples a dummy data phase signal stream which toggles continuously where the edges of the transitions are aligned with the edges of real data transitions. A sample of a dummy data phase logical signal level is done at a selected time before an anticipated receiving domain clock transition, and another sample of the dummy data phase logical signal level is done at a selected time after an anticipated receiving domain clock transition. According to one embodiment of the present invention, the amount of time preceding the clock transition for one sample is approximately the same as the amount of time after the clock transition for the other sample. According to the present invention, if a logical state transition is determined to have occurred at a time between the two samples, then the particular data path which is phase mimicked by the dummy data phase signal, is deemed unsatisfactory and an alternate data path is selected.

Delay element 41 in FIG. 3 receives transmitting domain clock signal T-CLK at its input. The input of delay element 41 is additionally connected to the clock input of both flip-flop 42 and flip-flop 44. The output of the Exclusive NOR gate 38 (typically, a square wave of non-50% duty cycle) is applied through respective flip-flops 44, 45, and 46. The input logical level from flip-flop 44 is clocked by a clocking pulse from the receiving clock domain, according to one embodiment of the present invention. The output logical level from flip-flop 44 is further applied to the input of D-type flip flop 45 which receives a clocking pulse from the sending clock domain. The resulting output of D-flip flop 45 drives the D-input of flip-flop 46, which in turn produces, according to one embodiment of the present invention, an output control signal DS_SEL_PATH_A and the complement of that signal. The respective output signal contacts of flip-flop 46 are referred to as outputs Q and $\bar{Q}$ or respectively as output contacts a and b. Flip flop 45 receives a clocking pulse from the transmitting clock domain at its clock input. Flip-flop 46 is enabled by a synchronizing signal I_DS_SYNC.

Delay elements 40 and 41 produce a predetermined similar signal delay TD in both the data phase signal and the receiving domain clock signals, according to one embodiment of the present invention. According to another embodiment of the present invention, different signal delays TD' and TD" can be applied to both the data phase signal and the receiving domain clock signals. Alternatively, different signal delays TD' and TD" can be applied to both the data phase signal an d the transmitting domain clock signals, where the data phase signal transitions with receiving domain clock signals. Treating the setup time of a flip-flop as TS and the hold time of a flip-flop as TH, a transition on a dummy data phase signal is expected between times TD–TH and TD–TS, TD being the receiving clock domain clock CLKLOCAL. The indicated time interval from TD–TS to TD–TS includes the time interval CLKLOCAL–TS to CLKLOCAL+TH. More particularly, TD–TH>TS and TD–TS>TH. It may be overly pessimistic to take the worst-case setup n to the worst case hold time. Optimum performance for TD is obtained where TD=TS+TH. However, the safest value for TD is TLOCALCLOCK/4, because it offers the largest margin for skews. Choosing this value causes paths A and B to be selected equally.

The phase comparison circuit 27 shown In FIG. 3 includes a plurality of D-type flip flops to reduce the uncertainty in the switching between data paths, as later described herein. A substantial exponential improvement in performance is achieved for an increase in the number (at least two of D-type flip flops which are connected in series at the output of Exclusive XNOR gate 38. And, such arrangements of D-type flip flops in the comparator circuit 27 do not significantly affect data transfers since the comparator circuit 27 is in the control path responsive to the relatively slow variations in the beat frequency, or difference between clocks in the transmitting and receiving domains. Although the comparator circuit 27 is described herein as being within the transmitting clock domain, it should be noted that the comparator circuit 27 may also be arranged in the receiving clock domain. In accordance with the present invention, the phase comparator circuitry 7 in FIG. 3 is exclusively digital and does not rely upon analog components.

FIG. 4 is a schematic diagram of a dummy data signal generator circuit 47 for operation in the circuit of FIG. 1. In particular, dummy data signal generator 47 includes flip-flop 49 and inverter 50 which feeds back the logical signal level at the Q output of flip-flop 49 to its D input. Dummy data signal generator 47 further includes flip-flop 51 which is connected at its D input to the Q output of flip-flop 49. Both flip-flop 49 and flip-flop 51 are clocked with transmitting domain clock signal T-CLK at their respective clock inputs. The Q output of flip-flop 51 is connected to dummy data path A which mirrors or mimics the phase of actual data in actual data path A and contains transitions according to the transmitting domain clock, according to one embodiment of the present invention. Dummy data signal generator 47 further includes flip-flop 52 and multiplexer 53. The Q output of flip-flop 52 is connected to dummy data path B to represent actual loading conditions experienced with actual data path B. The D input of flip-flop 52 is connected to the Q output of flip-flop 51. Multiplexer 53 has a control input "Always Select Path A" which is preferably set to ensure that the output of multiplexer 53 produces an output signal DB_DUMMY_PATH_A based upon path A. According to the components indicated, a dummy data stream is produced by continuously inverting clock bits arriving at a register that is sampled using the same clock that samples real data.

Figure 5A:
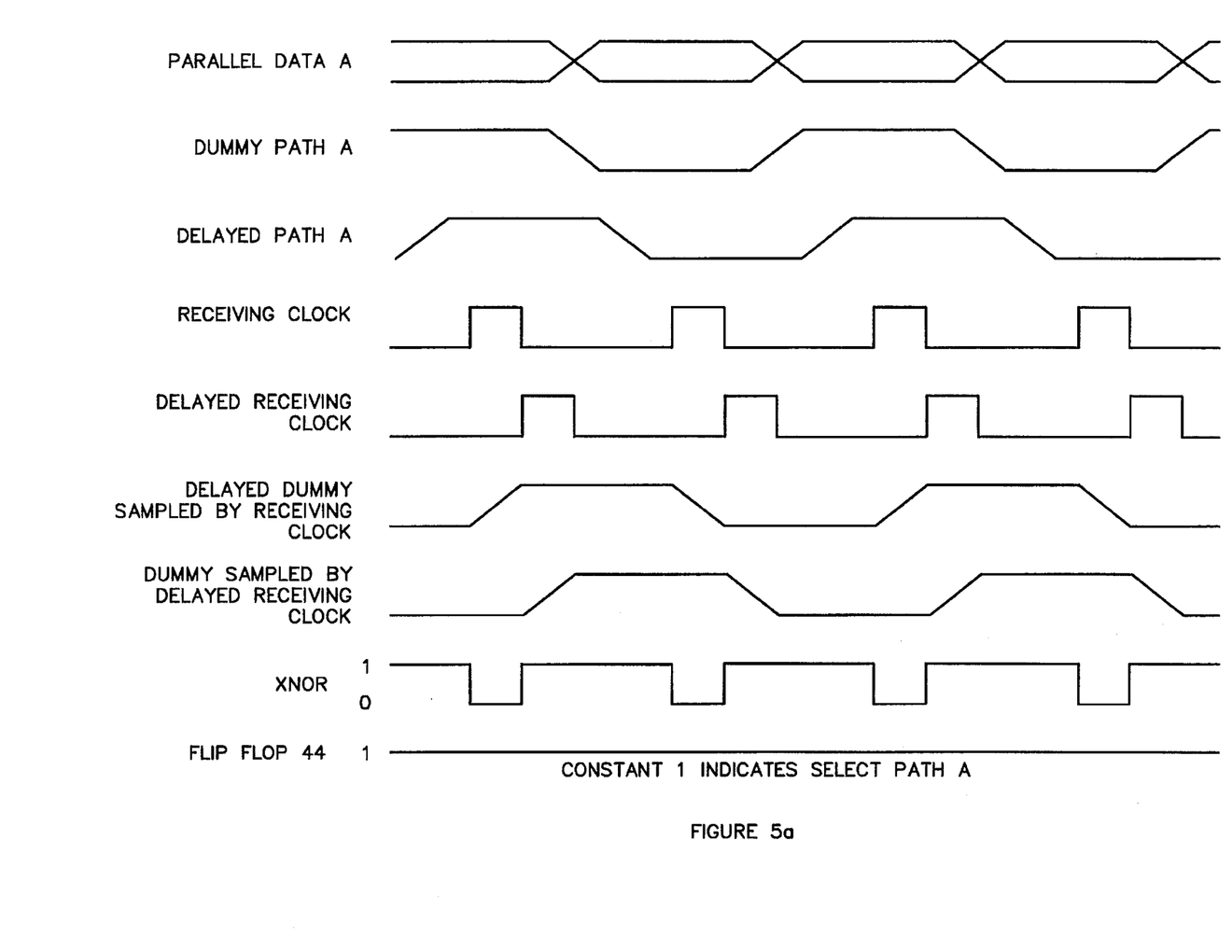
FIG. 5a–5b are charts illustrating selected waveforms in the operation of the circuit of FIG. 2.
Figure 5B:
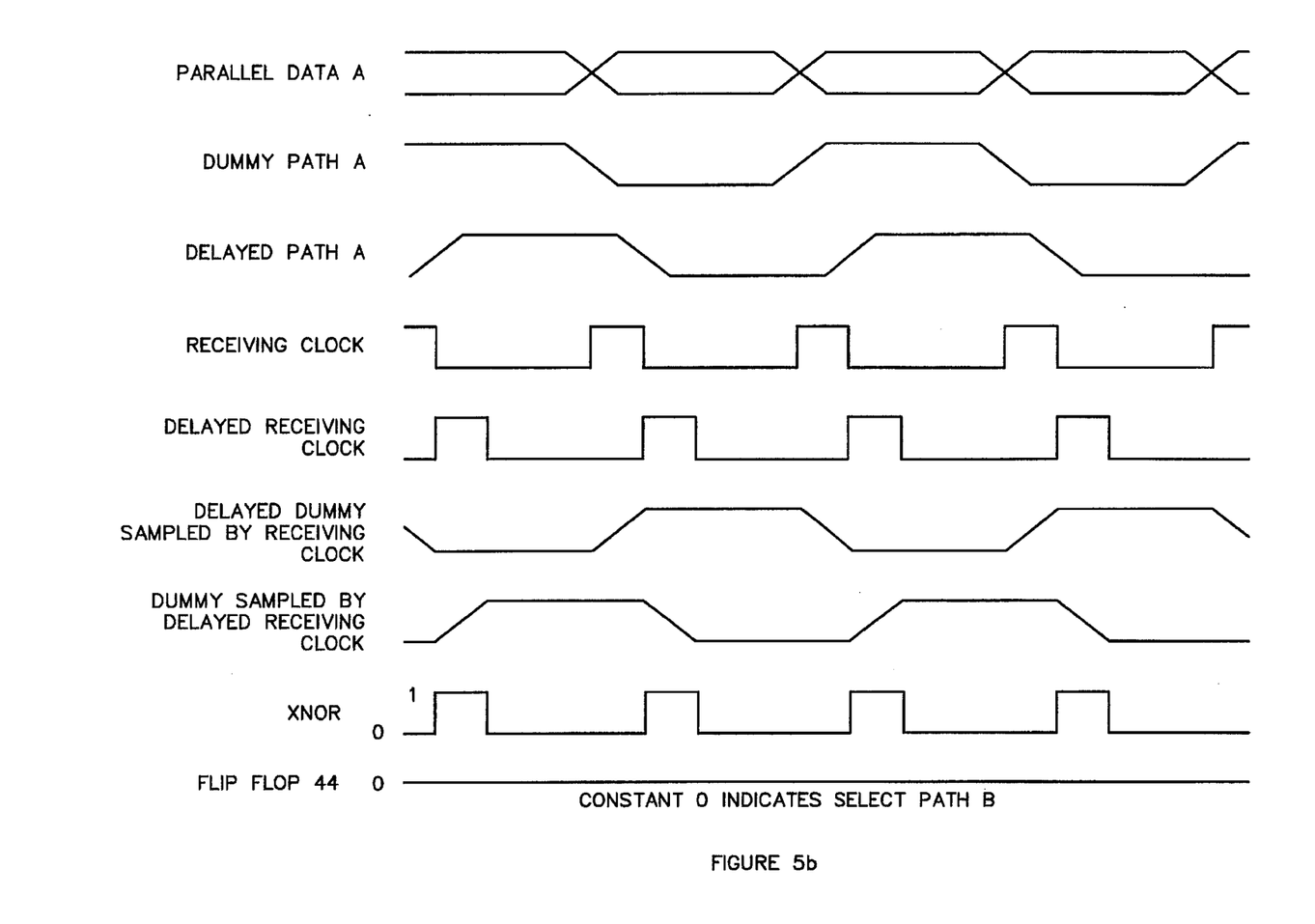

Referring now to the graphs of FIGS. 5a–5b, there are shown selected waveforms during operation of the circuit of FIG. 2. Specifically, FIG. 5a and 5b show timing diagram indications of parallel data pulses switching regularly at a predetermined frequency. Dummy Path A indicates a dummy signal A substantially tracking the waveform of actual Path A. In FIG. 5a, receiving clock pulses occur within the settled half-period portions of the pulses of signal A, as do the delayed receiving clock pulses. FIG. 5a further shows a delayed dummy waveform sampled by the receiving clock, and further a dummy path A waveform sampled by a delayed receiving clock. The delayed dummy sampled by receiving clock signal and the dummy sampled by delayed receiving clock signal sampled by the receiving clock essentially track each other's logical levels and accordingly produce a constant one output logic level from XNOR gate.

In FIG. 5b, local clock pulses occur during the critical portions of the pulses of signal A, as do the delayed receiving clock pulses. FIG. 5b further shows a delayed dummy waveform sampled by the receiving clock, and further a dummy path A waveform sampled by a delayed receiving clock. The delayed dummy data phase signal sampled by the receiving clock signal and the dummy data phase signal sampled by delayed receiving clock signal sampled by the receiving clock have opposite logical levels at the time of sampling and accordingly produce a constant zero output logic level from XNOR gate.

Therefore, the data synchronizer system and method of the present invention compare the phase relationship between clocks in different clock domains to determine the appropriate delay to be introduced in the transfer of data along one of a number of data paths between domains to assure receipt of the transmitted data at the receiving domain in synchronization with the associated clock. Latency, i.e., undue delay, is substantially reduced relative to conventional synchronization using dual-port memory buffers, and power dissipation is significantly reduced relative to conventional phase-lock loop synchronizers by using only few logic components to implement reliable data transfers between clock domains.

What is claimed is:

1. An apparatus for synchronizing the transfer of data between a transmitting unit having a first clock signal and a receiving unit having a second clock signal, said first and second clock signals having substantially the same frequency and are out of phase, the apparatus comprising:

a plurality of data paths coupled between the transmitting unit and the receiving unit, for selectively transferring data signals between the transmitting unit and the receiving unit;

a data path selector, disposed to receive the first and second clock signals, for generating first and second control signals, said data path selector, including:

a dummy data signal generator, disposed to receive said first clock signal, for generating a dummy data signal representing data transitions on one of said data paths in response to said first clock signal;

a first delay unit, having an output and disposed to receive said dummy data signal, for transmitting said dummy data signal after a first delay on said first delay unit output;

a first latch, having an output and an input that is coupled to said first delay unit output, for transmitting a first signal, having a first value, that is equal to said dummy data signal on said first latch output at a transition of said second clock signal;

a second delay unit, having an output and disposed to receive said second clock signal, for transmitting said second clock signal after a second delay on said second delay unit output;

a second latch, having an output and an input that is coupled to said dummy data signal generator, for transmitting a second signal, having a second value, that is equal to said dummy data signal on said second latch output, at a transition of said second clock signal received from said second delay unit; and a control signal generator for generating said first control signal if said first value and said second value are equal and for generating said second control signal if said first value and said second value are not equal.

2. The apparatus of claim 1, wherein said plurality of data paths include:

a first data path having a first control unit disposed between first and second portions of said first data path, said first control unit selectively connecting said first portion to said second portion in response to said first control signal;

a second data path including third, fourth, and fifth portions, said data path having:

a third delay unit for receiving said data signal from said third portion and transmitting said data signal through said fourth portion after a third delay;

a second control unit disposed between said fourth portion and said fifth portion, said second control unit selectively connecting said fourth portion to said fifth portion in response to said second control signal.

3. The apparatus of claim 2, wherein said third is inversely proportional to the number of data paths.

4. A method for synchronizing a data transfer between a transmitting unit having a first clock signal and a receiving unit having a second clock signal, said first and second clock signals having substantially the same frequency and are out of phase, said data transfer selectively occurring on one of a first data path transferring a first data signal having a first phase and a second data path transferring said first data signal having a second phase, the method comprising:

generating a first estimated signal from said first clock signal, a phase of said first estimated signal substantially equal to said first phase;

delaying said first estimated signal to generate a first delay signal;

generating a second delay signal equal to said first delay signal at a transition of said second clock signal;

delaying said second clock signal to generate a delayed second clock signal;

generating a third delay signal equal to said first estimated signal at a transition of said delayed second clock signal; and selecting said first data path to transfer said first data signal if a value of said second delay signal is equal to a value of said third delay signal.

5. The method of claim 4, further comprising the step of:

selecting said second data path to transfer said first data signal if a value of said second delay signal is not equal to a value of said third delay signal.

6. An apparatus for synchronizing a data transfer between a transmitting unit having a first clock signal and a receiving unit having a second clock signal, said first and second clock signals having substantially the same frequency and are out of phase, said data transfer selectively occurring on one of a first data path transferring a first data signal having a first phase and a second data path transferring said first data signal having a second phase, the apparatus comprising:

first generating means, for generating a first estimated signal from said first clock signal, a phase of said first estimated signal substantially equal to said first phase;

first delaying means, coupled to said first generating means, for delaying said first estimated signal to generate a first delay signal;

second generating means, coupled to said first delaying means, for generating a second delay signal equal to said first delay signal at a transition of said second clock signal;

second delaying means, disposed to receive said second clock signal, for delaying said second clock signal to generate a delayed second clock signal;

third generating means, coupled to said second delaying means and to said first generating means, for generating a third delay signal equal to said first estimated signal at a transition of said delayed second clock signal; and first selecting means, coupled to said second generating means and said third generating means, for selecting said first data path to transfer said first data signal if a value of said second delay signal is equal to a value of said third delay signal.

7. The apparatus of claim 4, further comprising:

selecting means, coupled to said second generating means and said third generating means, for selecting said second data path to transfer said first data signal if a value of said second delay signal is not equal to a value of said third delay signal.

* * * * *